INVENTORS
PAUL Y. DUFFEE
ROLAND J. BERGMAN
by Albert L. Peffers
ATTORNEY

INVENTORS
PAUL Y. DUNFFEE
ROLAND J. BERGMAN
by Albert L. Peffers
ATTORNEY

INVENTORS
PAUL Y. DUNFFEE
ROLAND J. BERGMAN
by Albert L. Jeffers
ATTORNEY

June 27, 1967  P. Y. DUFFEE ETAL  3,327,575
QUICK CHANGE FIXTURE

Filed March 17, 1965  6 Sheets-Sheet 6

INVENTORS
PAUL Y. DUNFFEE
ROLAND J. BERGMAN
by Albert L. Peffers
ATTORNEY

United States Patent Office 3,327,575
Patented June 27, 1967

3,327,575
QUICK CHANGE FIXTURE
Paul Y. Duffee, St. Marys, and Roland J. Bergman, Minster, Ohio, assignors to The Minster Machine Company, Minster, Ohio, a corporation of Ohio
Filed Mar. 17, 1965, Ser. No. 440,400
16 Claims. (Cl. 83—13)

This invention relates to a quick change fixture, and more particularly to a quick change fixture which provides means for quickly and accurately locating a forming, blanking and piercing tool or a workpiece or other instrument within a machine such as a power press, lathe, milling machine, shaper, jig bores, jig grinder, or the like. In the operation of certain ones of the machines described, it is essential to locate the forming tools in the machine in a very accurately defined relation; as for example, in a power press it is necessary to locate the die or tool in a precise manner in reference to its companion die or tool to provide a complete setup for power press operation. In the case of other types of machinery, a milling machine for example, it is important to locate the workpiece accurately in the machine. In all these various machines either the tool or the workpiece must be accurately located, mounted, and then clamped in position on the base plate, bed, or table of the machine, depending upon the particular machine in use.

Regardless of the application, however, it is necessary in these various machines to provide a method and structure for quickly and accurately receiving and mounting a given number, (as for example a die) and then replacing it with another member which is in turn accurately received and mounted. In the context of the following description, the invention will be described with particular reference to a machine, in the form of a power press, and the member to be mounted will take the form of a die, but it will be understood that the invention has utility with many different forming machines and the ready replaceability of the tools thereof on the workpieces thereon and their accurate location, and clamping in place will apply equally to these other machines.

The present invention has for one of its principal aims, the provision of a new and improved process for replacing dies, to lower the die design cost and die manufacturing cost and to reduce proportionately the production cost for manufacturing a particular item.

It is a further object of the present invention to provide a process for changing tools which incorporates a quick change fixtures, so that the tools can be replaced with speed and accuracy, and with minimum down time of the machine which can run almost continuously and yet produce an unlimited number of products. In place of costly delays and unproductive down time of the machine, it is possible by means of the present invention to make die changes with the quick change fixture of this invention, within a matter of minutes so that production is virtually continuous and production time is substantially uninterrupted between change-over from one die to the next.

It is an important feature of the present invention that in the process of replacing the die, the die is accurately and speedily located and clamped in its operative position, thereby making it feasible to undertake short production runs of a given product.

It is another feature of the present invention that once the die or tool is mounted in the quick change fixture it will maintain its operative position regardless of any power failure or other malfunctioning of the machine which might occur, i.e., the dies are not subject to damage because of such contingencies. In the practice of the present invention, it is contemplated that a die assembly be formed of unitary top and bottom parts and in the process of mounting each part is caused to simply slide within a quick change fixture which provides an approximate alignment of the part within the press. Prior to clamping the part in place, however, a further positioning is imparted by additional positioning means which perfectly aligns and positions the part.

It is an overall object of the present invention to provide a quick change fixture which accurately and readily disposses the tool within the machine and which is operator controlled by motor means in such manner that the operator can at any time extend the quick change fixture and bring the tool to an extended position where it can be readily removed and replaced with a different tool and then by further operation of the motor means, retracted into perfect alignment within the machine for subsequent operation.

It is a still further object of the present invention to provide a novel clamping method for the die or other tool which serves as a mounting means in a quick change fixture and, additionally serves to hold the die or other tool in operative position during operation of the machine. The mounting means for the die has a further novel feature in that it serves to provide an approximate alignment for the die or other tool before it is retracted and given its perfect alignment within the machine.

A salient object of the invention is the provision of a quick change fixture which eliminates a conventional die set for a forming machine.

Other objects and features of the present invention will become apparent from a consideration of the following description, which proceeds with reference to the accompanying drawings, wherein.

Figure 1:
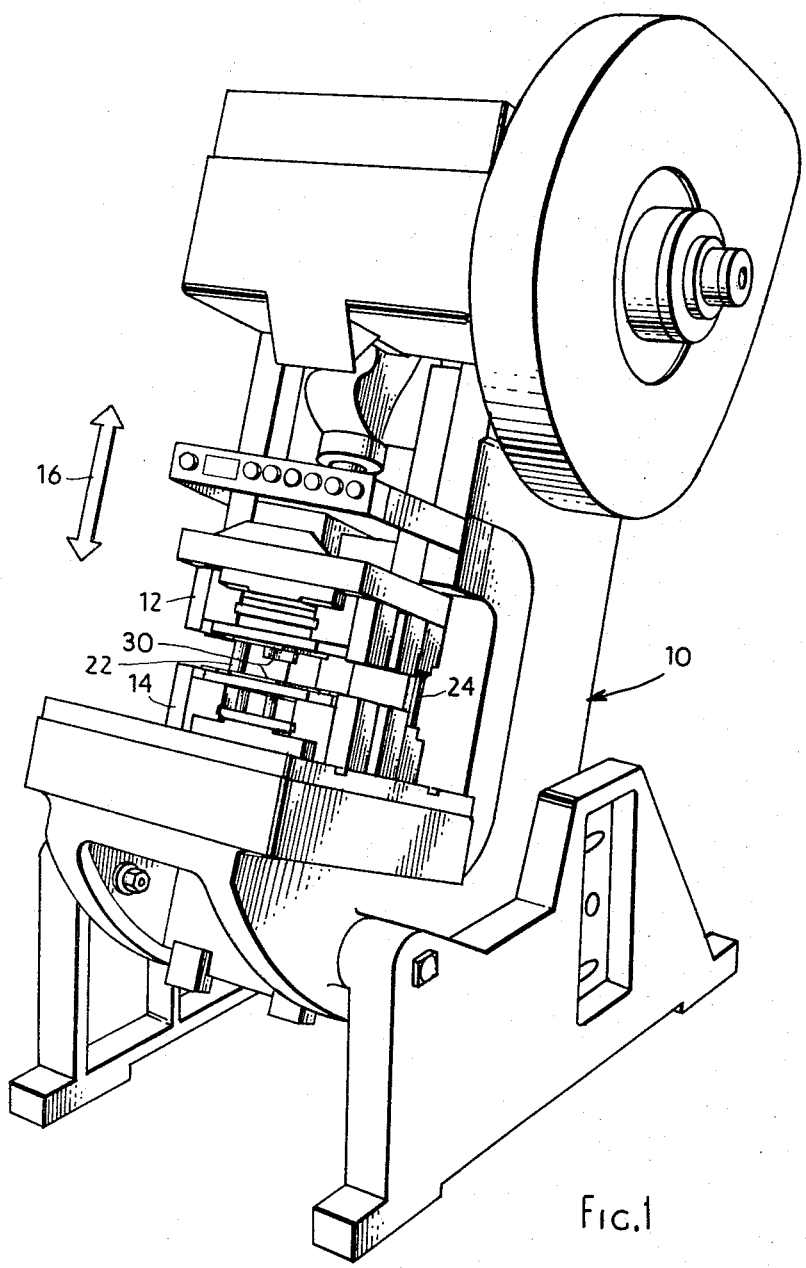
FIGURE 1 is an isometric view of a power press having the upper and lower parts of a die in quick change fixtures incorporating the present invention therein.

Referring now to the drawings, the power press designated generally by reference numeral 10 includes a non-reciprocating lower die fixture 14 and an upper die fixture 12 mounted for vertically reciprocal movement in the directions of the double arrow-headed line 16. The fixture 12 is guided in its reciprocable vertical movement by spaced guide bushings 18 and 20 (FIGURE 2) which receive guide posts 22 and 24 respectively, mounted uprightly in the lower die fixture 14.

The upper and lower die fixtures 12 and 14 are substantially identical so that only one will be described, it being understood that the die parts which are carried by the upper and lower fixtures respectively are related to each other as male and female dies.

Figure 3:
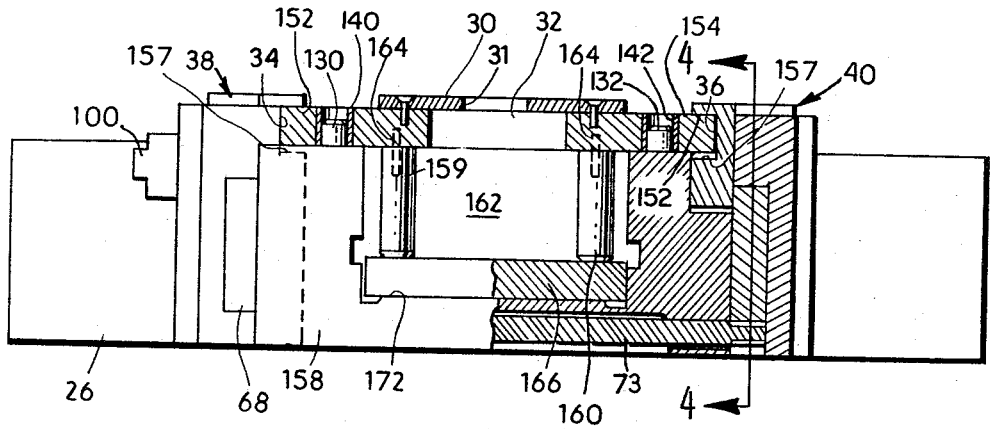
FIGURE 3 is a front view of the lower die fixture of FIGURE 2.
Figure 8:
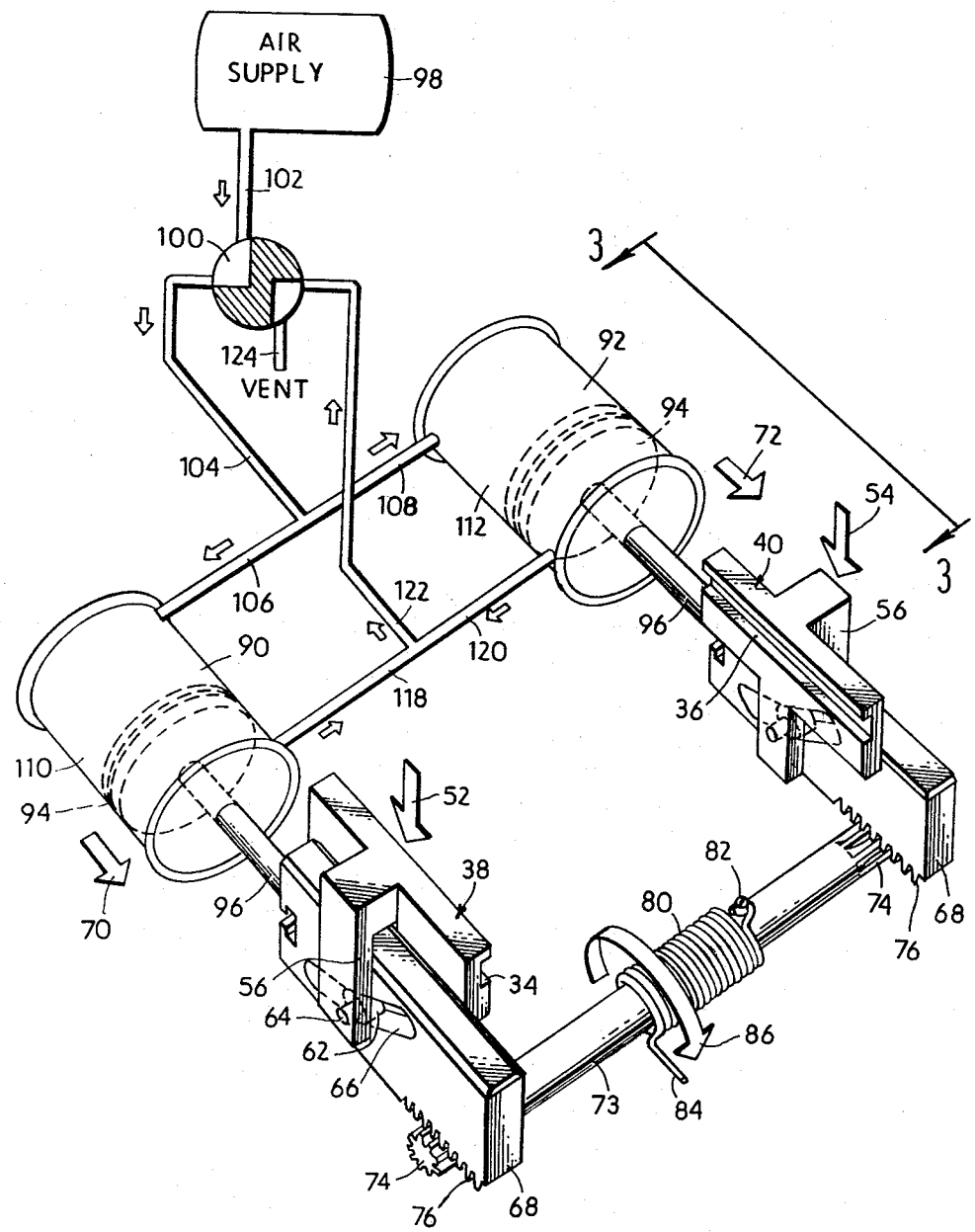
FIGURE 8 is a perspective schematic view of the actuator system for extending and retracting a die part during a quick change operation and subsequently retracting it to operative position.

Referring to FIGURE 3, a die 30 having a shaping element 31 is secured to die plate 32 and thereby forms a lower die part. The die part is slidably received within a lower die part. The die part is slidably received within the two ways or grooves 34, 36 (FIGURE 8) with the two of its opposite edges or sides thereby mounted one within each of a pair of mounting devices 38 and 40 which are in a raised position (FIGURE 8) at the start of the die change operation in order to receive the die part.

Replacement and mounting of the die part is simply a matter of sliding the two opposite edges of a selected die part within the ways or grooves 34, 36 of the mounting devices 38 and 40 which are, as described previously, initially extended (raised in the lower fixture 14 and lowered in the upper fixture 12).

Figure 4:
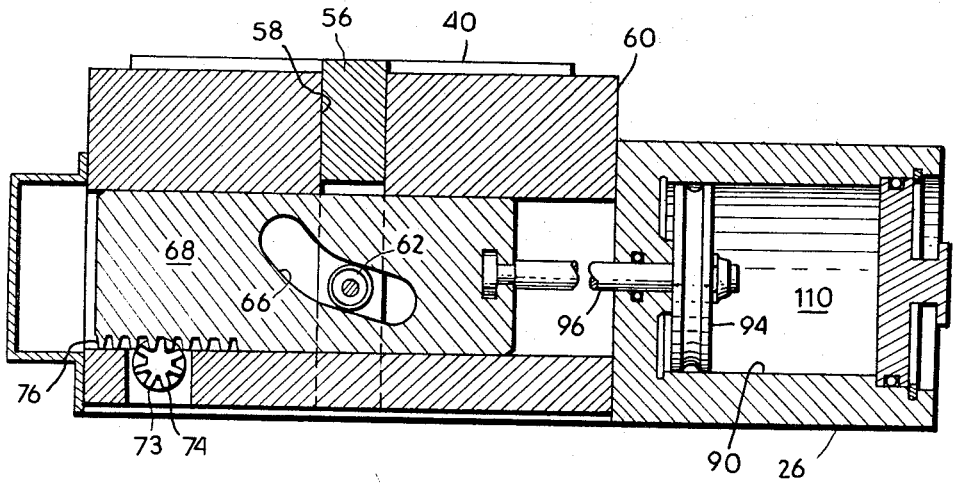
FIGURE 4 is a detail view of the cam slide and associated actuating structure; looking generally in the direction of the arrows 3—3 of FIGURE 8.

The die part is given an approximate alignment by bringing the locating ears 42, 44 against coacting stops 48, 50 (FIGURE 5) within the ways 34 and 36. After the die parts are so disposed within the mounting devices 38 and 40, the devices 38, 40 are caused to move vertically. The vertical direction of retraction for the lower fixture is in a downward direction indicated by the arrows 52, 54 (FIGURE 8), this being effected by a slide section 56 (FIGURES 5, 8) which fits into slideways 58 of a housing 60. Mounting devices 38 and 40 are each operated in the same manner, both being positively drawn downwardly by means of an associated cam-follower 62 (FIGURE 8) which is mounted on the lower end of the slide 56 by roller shaft 64. The cam-follower 62 is received within a cam slot 66 configured in a cam slide rack 68 and the slot 66 is so configured that when the slides 68 are moved in the direction of the arrows 70, 72 (FIGURE 8) the mounting devices 38, 40 are pulled downwardly in the direction of the arrows 52, 54 by the operation of cam-followers 62 and cam slots 66. The cam slot 66 is so configured that it has an angle of approximately 12° (FIGURE 4) in engagement with the follower 62 when the die part is fully retracted. While this is not a locking angle, it sufficiently approximates a locking angle to effect a position holding action on the devices 38 and 40 with the die part secured thereto.

The two cam slides 68 are tied together by a torsion rod 73 having pinions 74 at the ends thereof which mesh with teeth 76 at the ends of the slides thus insuring that the devices 38 and 40 will move simultaneously thereby drawing the die part squarely downwardly and upwardly. That is, the die part is constrained to rectilinear movement at each of its four corners, this being an important factor in the proper alignment of the die part within the fixture.

The torsion rod 73 has a torsion spring 80 which is anchored at one end 82 to the rod 73 and has a free end 84 anchored to the fixture so that when the mounting devices 38 and 40 are being lowered by movement of the slides 68 in the direction of the arrows 70, 72, the shaft 73 is rotated in the direction of the arrow 86, thus uncoiling or relieving the tension in the spring 80. There are a number of revolutions of preload of the spring 80 so that resilient effort is always exerted by the coils tending to hold the mounting devices 38 and 40 downwardly with the die part in its operative position. Thus when the devices 38, 40 are fully retracted, there remains several revolutions of preload which are sufficient to urge the slides 68 in the direction of arrows 70, 72 and this acts through the cam slot 66 which has an approximate 12° angle relation with the followers 62 thereby holding the followers 62, devices 38, 40 and die part in a fully retracted position.

The mounting devices 38 and 40 are raised and lowered by a pair of air cylinders operatively connected with the cam slides 68. There are suitable pneumatic line connections from an air supply 98 so that when valve 100 is in the position shown in FIGURE 8 the line 102 is connected with line 104 and branch lines 106 and 108 leading to the expanding chambers 110 and 112 respectively of the cylinders 90, 92 and moving the slides 68 in the direction of the arrows 70, 72. When the air cylinders are operated as described, lines 118, 120 are connected to line 122 which is connected through valve 100 to exhaust 124. When the valve 100 is actuated (FIGURE 8), the line 102 is connected to line 122 communicating air pressure through lines 118 and 120 to the pistons 94, reversing the direction of the pistons from the direction of the arrows 70, 72 and the cam slides 68 are likewise reversed whereby the cam surfaces of the cam slot 66 cause the mounting devices 38, 40 to raise thereby extending the die part thereon. In the case of the lower die part, the die part is raised and in the upper fixture the die part is lowered.

When the devices 38, 40 are extended, the die parts can be caused to slide outwardly of the slot 34, 36 and replaced with different die parts. The valve 100 is connected with the air cylinders which operate the mounting devices 38 and 40 in both the upper and lower fixtures so that the operator need actuate the valve 100 only once in order to extend the mounting devices 38 and 40 in both the lower and upper fixtures.

When the die part is extended, the torsion bar 73 is rotated counter to the direction of the arrow 86 (FIGURE 8) thus tightening the spring 80. In the event there is a power failure the torsion spring 80 will unwind, rotating the shaft 73 in the direction of the arrow 86, retracting the mounting devices 38 and 40 and the die part carried thereby; consequently, the normal position of the die part is a retracted position. Also, should there be a power failure in the air supply when the die part is fully retracted, the torsion spring 80, not being completely unwound, to the extent of several revolutions of preload, will hold the die part retracted because of the torsion bar 73 being urged in the direction of the arrow 86.

As described, the cam slot 66 is configured so that when the die part is fully retracted the cam-follower 62 is at a portion of the cam surface 66 which is approximately 12° and this provides a sufficient mechanical advantage so that even a slight force is sufficiently effective for maintaining the mounting devices 38 and 40 in a retracted position. Thus, the die part is never extended by inadvertent power failure during a press operation. It is only when the press operation is stopped and there is power available from supply 98 and the valve 100 is suitably positioned that the die part can be extended for replacement.

Figure 2:
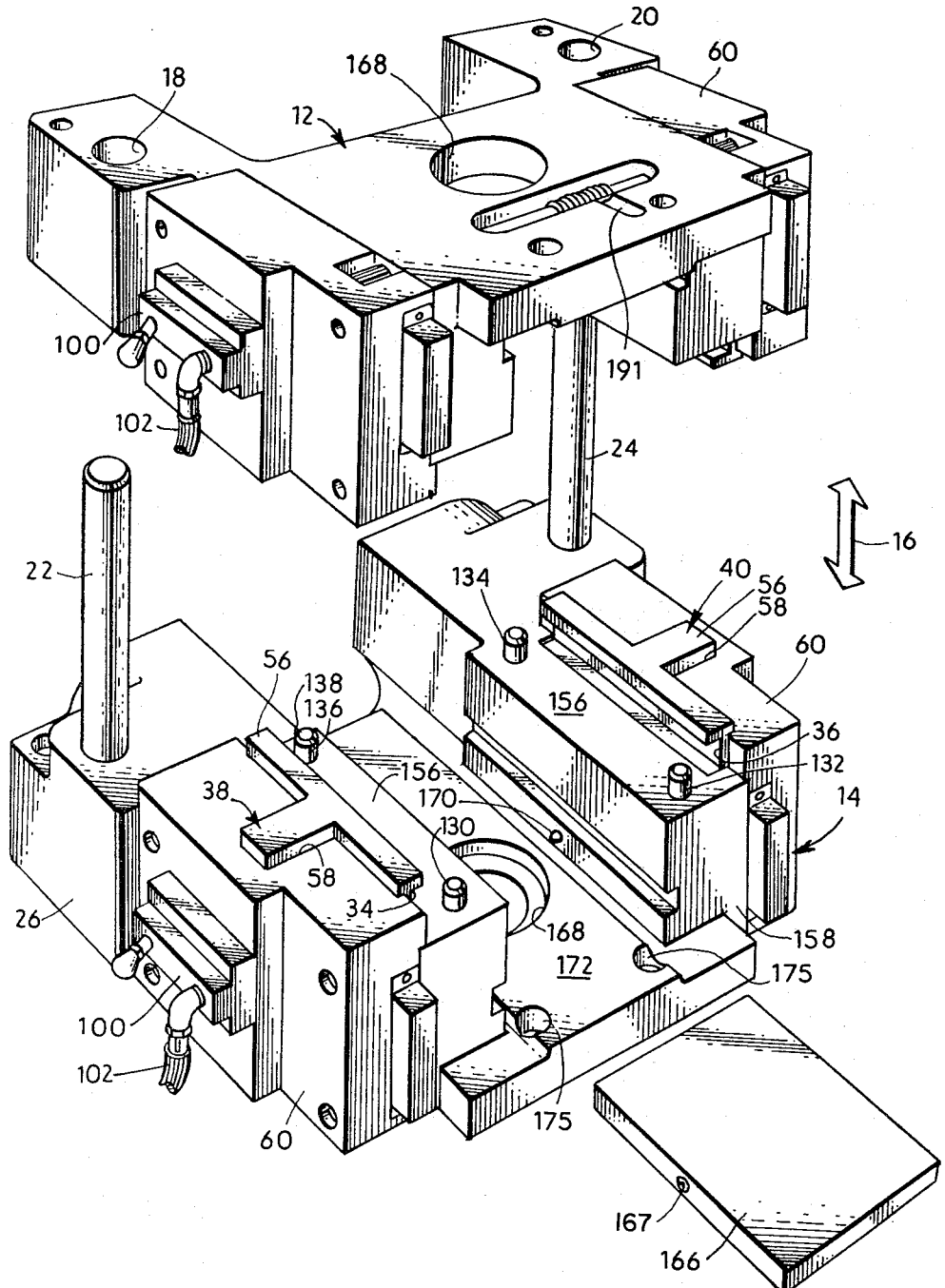
FIGURE 2 is a perspective view showing the upper and lower fixtures.
Figure 5:
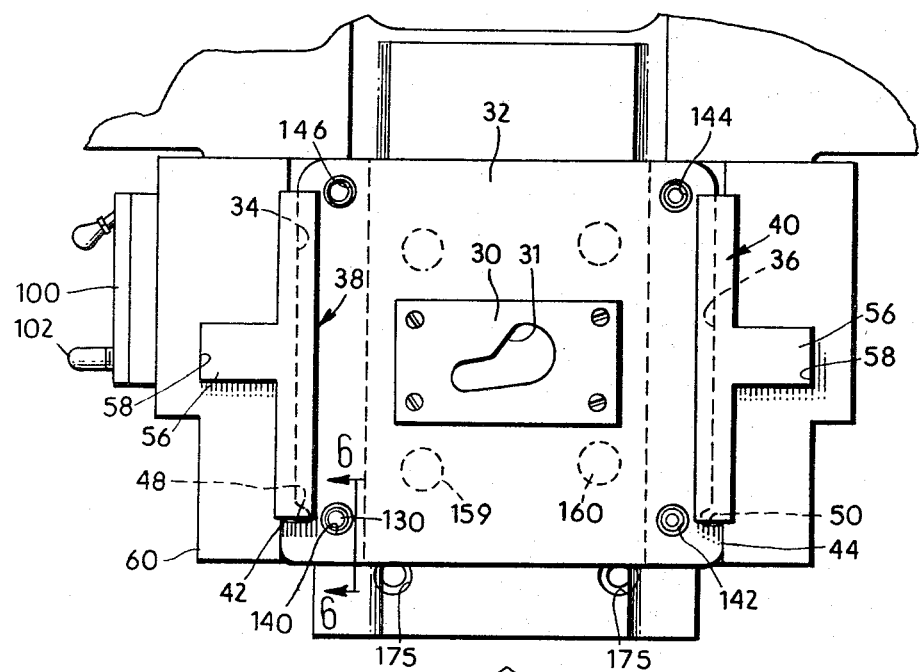
FIGURE 5 is an enlarged partial top view of the lower fixture and the die part therein.

The die part is accurately located within the fixture by means of locating pins 130, 132, 134 and 136 (FIGURE 2). These pins have tapered upper ends 138 (FIGURES 2, 6, 7) and the die part is approximately aligned by bringing the locating ears 42, 44 against the stops 48, 50 of the mounting devices 38, 40 (FIGURE 5) so that the openings 140, 142, 144 and 146 are approximately in alignment with the pins 130, 132, 134 and 136, when the die part is fully inserted within the mounting devices as indicated by arrow 148 (FIGURE 5).

Figure 6:
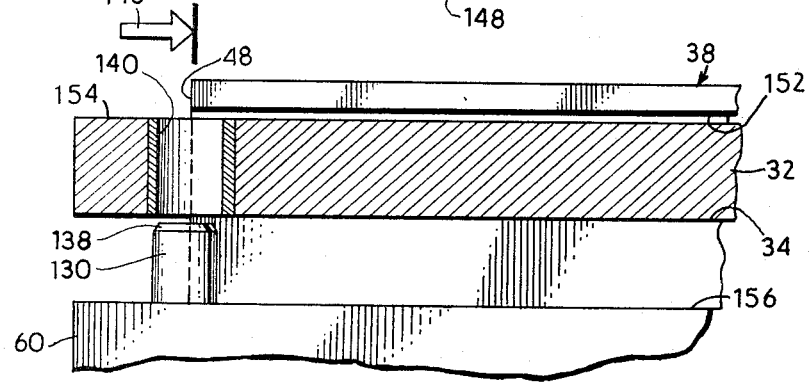
FIGURE 6 is an enlarged section view taken on line 6—6 of FIGURE 5 and illustrating the direction of an insertion of the die part into the fixture.
Figure 7:
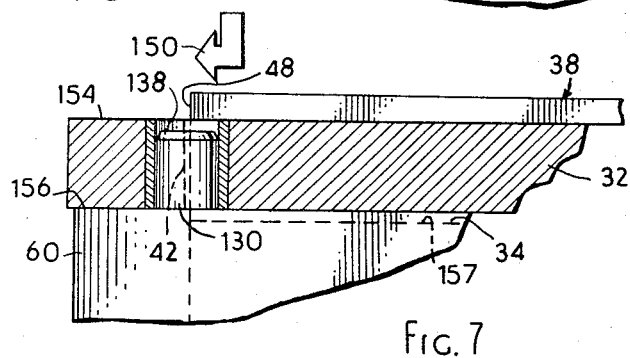
FIGURE 7 is a fragmentary view of the left hand side of FIGURE 6 after the die part is completely in operative position.

As the mounting devices carry the die part downwardly (in the lower fixture) and the die part nears its completely retracted or operative position, the approximate alignment described insures at least partial entry of the locating pins 130–136 within openings 140–146 so that further downward travel will pass the locating pins entirely within the openings (FIGURE 7) thereby laterally adjusting the die part by whatever amount is necessary for perfect alignment. It is provided that the travel indicated by arrow 148 in FIGURES 5 and 6 is an overtravel and the fine or "perfect" adjustment always backs off the travel by a slight amount as indicated by the arrow 150 (FIGURE 7). The adjustment rendered by the pins 130–136 is effective for moving the die part to the right and left (FIGURE 5) as well as correcting the overtravel. It is always provided that the first approximate alignment is somewhat less than the final perfect alignment so that the die part can slightly reverse itself in the direction of the arrow 150 (FIGURE 7).

When the die part is fully retracted the upper edge 152 (FIGURE 3) of the slots 34, 36 of the mounting devices 38, 40 clamp over the upper face 154 of the die plate 32 of the die part. The upper edge 152 of the slots 34, 36 thus positively engage the upper surface 154 of the die plate 32 of the die part, and clamp the die plate against face 156 of lower housing 158. The lower edge 157 of the slots 38, 40 is below the surface 156 of the lower housing 158 (FIGURE 3). In this position, the die part is perfectly aligned because of the entry of the locating pins 130–136 within the companion openings 140–146 of the die plate and the die plate is positively held in such position by means of the clamping effort of the mounting devices 38 and 40.

The die is also supported by means of support blocks 159, 160, there being generally four such support blocks which are selectively spaced around die opening within a recess 162 of the lower housing 158 and are secured at one end to the die plate 32 by means of locking sleeves 164 and bear at their opposite ends against a wear plate 166 (FIGURES 2 and 3), the wear plate 166 being proportioned to fit slidably within the recess 162 and includes indentations 167 within two opposite edges of the wear plate to receive therein spring loaded pintles 170 which are mounted within the housing 158. The wear plate 166 rests on the base 172 of the housing 158 which is bolted or otherwise secured by openings 175 to the press bed. It will thus be seen that once the die part is fully retracted it is perfectly located, it is retained clamped in place either by the air cylinders or by the torsion spring 80 so it cannot be removed or extended, and it is fully supported both by the housing 158 along two edges, and is supported further by the support blocks 159, 160 which are positioned between the die part and the wear plate 166 carried by base 172 of the housing 158.

The structure which has been described for the lower fixture applies equally to the upper fixture except that the lower fixture instead of including a wear plate and support blocks, may be equipped with a cushioning device (not shown) to be received within the recess 162 of the lower housing 158 and for that, provision is made in the lower housing 158 for an opening 168. The cushion is not shown but its provision and its inclusion is well within the teaching of the present invention. A die cushion or ejector means could, of course, be incorporated in the lower fixture in the open space between blocks 159, 160, if desired.

In operation, the die parts are changed by first extending the mounting devices 38 and 40 (FIGURES 2, 3, 4, 8), this being accomplished by operating the valve 100 to connect line 122 with line 102 and air supply 98. The pistons 94 are moved in the direction opposite to arrows 70, 72 (FIGURE 8), chambers 110, 112 being connected to lines 106, 108 and 104 and through valve 100, which is connected to exhaust vent 124. The piston rods 96, together with the cam slides 68, are moved with the pistons 94, causing the cam surfaces of the cam slot 66 to bias cam-followers 62 in an upward direction and thereby simultaneously raising devices 38 and 40 which are tied together through tortion rod 73, the track portions 56 moving rectilinearly within track guides 58 of the fixtures 12 and 14. The lower edges 157 of the slots or ways 34, 36 (FIGURE 8) engage the undersurface of the die plate 32 (FIGURE 3) thereby raising the die part and lifting it off of the locating pins 130–136. The die part in the lower fixture is lifted upwardly and the die part in the upper fixture is displaced downwardly so that the die parts can be then withdrawn by sliding them outwardly from the ways or slots 34, 36 and then replaced with a new die part as preferred. If the two devices 38 and 40 were not tied together by torsion rod 73 one edge of the die part could lift ahead of the other edge, producing binding which resists disengagement of the openings 140–146 with the companion locating pins 130–136. This contingency is obviated by insuring that the devices are tied together.

A new die part is provided by simply inserting companion male and female die parts in the upper and lower pairs of carriers, or mounting devices 38, 40 by inserting the parts edgewise within the companion ways 34, 36 of the carrier devices 38, 40 so the locating ears 42, 44 (FIGURE 5) engage stops 48, 50. The direction of inserting the die parts is indicated by the arrow 148 in FIGURE 5, and with the die parts so located there is an approximate alignment of the die parts within the machine. The valve 100 is next operated to connect air supply 98 and line 102 with line 104 (FIGURE 8), which in turn connects branch lines 106 and 108 and pressurizes the cylinders 90, 92 moving the pistons 94 in the direction of the arrows 70, 72 (FIGURE 8) and in doing causes movement of the piston rods 96 and the cam slides 68 in the direction of the arrows 70, 72 so that the upper surfaces of the cam slots 66 bias the cam-followers 62 of the respective devices 38, 40 in a downward direction indicated by the arrows 52, 54. Since the two slides 68 are tied together through the torsion rod 73, they are caused to move simultaneously thus causing the die parts to move downwardly in a rectilinear motion. This insures "square" disposition of the die plate 32 so that one side does not move ahead of the other and preventing binding of the openings 140–146 as the locating pins 130–136 pass therein. The approximate alignment of the die plate 32 is such that the tapered ends 138 of the locating pins (FIGURE 6) will at least partially enter the companion locating openings 140–146 and as the pins 130–136 fully enter the openings 140–146 the die part is perfectly and finally located. The upper surfaces 152 and 150 of the ways 34, 36 of the devices 38, 40 engage the upper surface or face 150 of the die plate 32 forcing the full entry of the locating pins 130–136 into the openings and clamp the die parts in perfect and final alignment within the die fixture 14 (FIGURE 3). The first approximate alignment effected by inserting the die part in the carrier device 38, 40 is perfected by entry of pins 130–136 into openings 140–146. When full clamping and alignment occurs, the pistons 94 have reached their maximum stroke in the direction of the arrows 70, 72 and the torsion spring 80 is unwound to its maximum extent but there are remaining several revolutions of preload of the spring 80 which still urges the slide 68 in the direction of the arrows 70, 72 thus urging the devices 38, 40 in a clamping direction, i.e., in the direction of arrows 52, 54 (FIGURE 8) so that if there should be a failure in the air supply the force of the torsion spring 80 is sufficient to maintain a clamping effort, it being appreciated that the cam surfaces are configured to provide approximately 12° cam angle which provides a substantial mechanical advantage in the clamping direction so that even a slight spring force is sufficient to maintain the die parts retracted and thereby to prevent drop out of the fixture.

When the die parts are thus located in perfect alignment, and are clamped, they are amply supported both by engagement with the housing 158, and also, by taking support through support blocks 159, 160 (FIGURE 3) there being approximately four selectively spaced blocks 159, 160 which are located in noninterfering relation with the stamped article which drops into the recess 162 and then out of the press. The support blocks are positioned between the die plate 32 and a wear plate 166 which in turn rests on a base 172 of the housing 158 bolted through bolt openings 175 to the press bed.

When it is desired to replace the die parts the total time necessary for effecting a die change and resuming operation in the manner described is only a matter of minutes. It has been possible, under actual running conditions to effect as many as six die changes and the stampings of ten parts from each die in a total lapsed period of only nine minutes. Our invention makes it feasible to change from the fabrication of one part to another in an insignificant period of time, thus contributing to the useful running time of the die press and substantially reducing production costs by lowering the preparation time for a die change. Also, the delivery time for a product can be reduced because the machine can be equipped with a suitable set of dies to make the product whenever it is convenient to make a quick change during the running of the machine.

Figure 9:
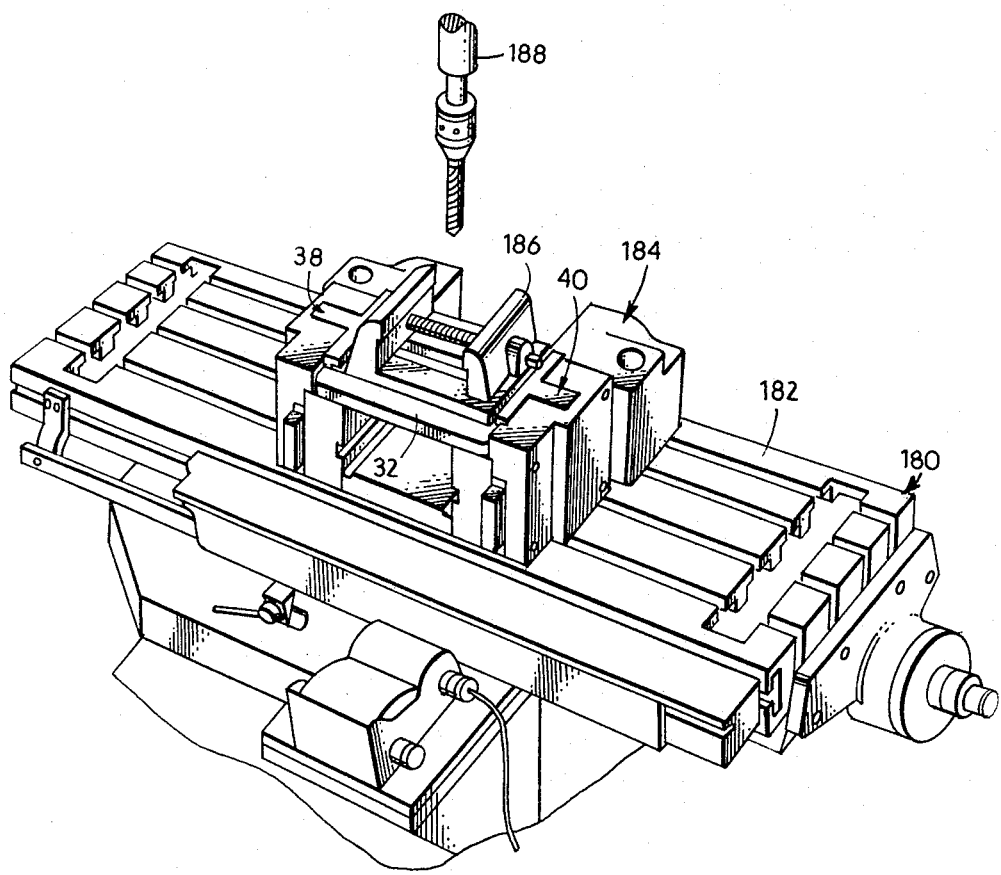
FIGURE 9 illustrates another embodiment of the invention in which the quick change fixture is incorporated within a different machine, in this case a vise and milling machine.

Referring next to the embodiments shown in FIGURE 9 it will be shown that the invention can be used not only with presses but with other machines as well, as for example, milling machine. The milling machine designated generally by reference numeral 180 includes a table 182 and a fixture designated generally by reference numeral 184. The purpose of this invention is to accurately locate a vise 186 and a workpiece (not shown) which is secured thereto. It is necessary to accurately locate the workpiece in relation to a reference point so that the various milling operations which are performed by an overhead cutter 188 will be accurately located in relation to the reference point. The vise 186 is mounted on a plate 32, corresponding to the die plate in the previous embodiment, and is supported by support devices 38, 40 in the same manner as the embodiment of FIGURES 1–8. The mounting devices effect clamping, approximate alignment of the vise 186 and the same as in the previous embodiment and openings (not shown) are received within companion locating pins 130–136 (not shown) the same as in the previous embodiment to effect a perfect alignment.

Except for the substitution of vise 186 in place of die 30 the invention is the same as previously described for locating, clamping and supporting functions. Instead of a press bed or slide, there is a table but the basic purpose of the structure remains the same, namely, that of accurately locating, clamping and supporting an article and incorporating the ability of ready interchangeability by effecting operation of cylinders which will extend the supporting structure for the workpiece and permit ready replaceability of a workpiece for the purpose of accurately locating another workpiece, this time instead of in conjunction with a companion die, the first location being in relation to a reference point and the various milling operations performed by the overhead cutter 188 being in relation to a reference point, in relation to which the cutter 188 moves in a quadrant to perform its various designated milling operations.

Throughout this specification and in the claims, the term "forming machine" is intended to include all such material working machines which are adapted for working metals and non-metal alike in the various operations of cutting, shaping, drilling, turning, grinding and any such other metal or non-metal working whether by electrical, chemical or mechanical working operations.

Although the present invention has been illustrated and described in connection with a few selected example embodiments it will be appreciated that these are illustrative of the invention and are by no means restrictive thereof. It is reasonably to be expected that those skilled in this art can make numerous revisions and adaptations of the invention, and it is intended that such revisions and adaptations will be included within the scope of the following claims as equivalents of the invention.

We claim:

1. Apparatus for readily mounting and demounting a forming tool, comprising a retractable and extendible mounting means adapted for receiving said tool in its extended position, camming means for extending and retracting the mounting means into and out of operative positions within said apparatus, locating means operatively coacting with surfaces of said tool to accurately locate said tool as it is retracted into operative position within said apparatus, said mounting means including clamping surfaces which retain said tool within its operative position when it is retracted within said apparatus, and resilient means for biasing said mounting means in a retractive direction which effects clamping of the tool in its operative position.

2. Apparatus for readily mounting and demounting a forming tool, comprising a retractable and extendible mounting means adapted for receiving said tool in its extended position, camming means for extending and retracting the mounting means into and out of operative positions within said apparatus, locating means operatively coacting with said tool to accurately locate said tool as it is retracted into operative position within said apparatus, said mounting means including clamping surfaces which retain said tool within its operative position when it is retracted within said apparatus, resilient means for biasing said mounting means in a retractive direction which effects clamping of the tool in its operative position, and motor means for controllably extending and retracting said mounting means together with its associated tool to permit replacement of the tool, said resilient means being yieldably opposed to extending said mounting means to urge said mounting means and tool in a normally retracted position.

3. Apparatus for readily mounting and demounting a tool within a forming machine, comprising extendible and retractable carrier means disposed in spaced apart relation to slidably receive a tool thereon, locating means for accurately locating said tool in relation to said carrier means, a combination cam and cam-follower for effecting retracting and extending movements of said carrier means and the tool mounted thereon, and means including a rack and pinion for operatively interconnecting said spaced apart carrier means to communicate power therebetween for insuring the simultaneous actuation of said carrier means.

4. Apparatus for readily mounting and demounting a tool within a forming machine, comprising extendible and retractable carrier-and-clamping means disposed in spaced apart relation to slidably receive a tool thereon, first locating means carried by the tool for cooperation with the clamping means for accurately locating the tool in relation to said carrier means, a combination cam and cam-follower for effecting retracting and extending movements of said carrier means and the tool mounted thereon, means for operatively interconnecting said spaced apart carrier means to communicate power efforts therebetween for insuring the simultaneous actuation of said carrier means, and second locating means carried by the carrier means which accurately define the operative position of said tool within said apparatus as the tool is moved into final operative position and is thereafter clamped in such position by said carrier means.

5. Apparatus for readily mounting and demounting a tool within a forming machine, comprising extendible and retractable carrier-and-clamping means disposed in spaced apart relation to slidably receive a tool thereon, first locating means for accurately locating the tool in relation to said carrier means, a combination cam and cam-follower for effecting retracting and extending movements of said carrier means and the tool mounted thereon, means for operatively interconnecting said spaced apart carrier means to communicate power efforts therebetween for insuring the simultaneous actuation of said carrier means, second locating means which accurately define the operative position of the tool within said apparatus as the tool is moved into final operative position and is thereafter clamped in such position by said carrier means, and resilient biasing means acting through said interconnecting means to yieldably retain said tool within its final retracted position.

6. Apparatus for readily mounting and demounting a tool within a forming machine, comprising extendible and retractable carrier-and-clamping means disposed in spaced apart relation to slidably receive a tool thereon, first locating means for accurately locating the tool in relation to said carrier means, a combination cam and cam-follower for effecting retracting and extending movements of said carrier means and the tool mounted thereon, means for operatively interconnecting said spaced apart carrier means to communicate power efforts therebetween for insuring the simultaneous actuation of said carrier means, second locating means which accurately define the operative position of the tool within said apparatus as the tool is moved into final operative position and is thereafter clamped in such position by said carrier means, resilient biasing means acting through said interconnecting means to yieldably retain said tool within its final retracted position, and operator controlled power means for operating said cam and cam-follower to effect extending of said carrier means and tool against the resistance of said resilient means to dispose the tool in an extended position for slidable replacement.

7. In a forming apparatus, a combination tool mounting and clamping device adapted for readily mounting and demounting a forming tool, comprising a pair of spaced extendible and retractable mounting means having means for removably receiving the tool thereon and forming detachable connections therewith, means for simultaneously retracting said mounting means and tool into a final operative position on said apparatus, means forming a clamping surface on said mounting means for retaining the tool within its final operative position, and biasing means for urging said mounting means in a retractile direction which effects clamping of said tool in its final operative position.

8. In a forming apparatus, a combination tool mounting and clamping device adapted for readily mounting and demounting a forming tool, comprising a pair of spaced extendible and retractable mounting means having means for removably receiving the tool thereon and forming detachable connections therewith, means for simultaneously retracting said mounting means and tool into a final operative position on said apparatus, means forming a clamping surface on said mounting means for retaining the tool within its final operative position, biasing means for urging said mounting means in a retractile direction which effects clamping of said tool in its final operative position, and locating means carried by said tool and defining the position of said tool on said mounting means to dispose the tool in the proper operative position as it is retracted into final position in said apparatus.

9. In a forming apparatus, a combination tool mounting and clamping device adapted for readily mounting and demounting a forming tool, comprising a pair of spaced extendible and retractable mounting members having means for removably receiving the tool thereon and forming detachable connections therewith, means for simultaneously retracting said mounting members and tool into a final operative position on said apparatus, means forming a clamping surface on said mounting members for retaining the tool within its final operative position, biasing means for urging said mounting members in a retractile direction which effects clamping of said tool in its final operative position, a locating means carried by said tool and defining the position of said tool on said mounting members to dispose the tool in the proper operative position as it is retracted into final position in said apparatus, and means for interconnecting said mounting members to move said tool rectilinearly into final operative position.

10. In a forming apparatus, a combination tool mounting and clamping device adapted for readily mounting and demounting a forming tool, comprising a pair of spaced extendible and retractable mounting members having means for removably receiving the tool thereon and forming detachable connections therewith, means for simultaneously retracting said mounting members and tool into a final operative position on said apparatus, means forming a clamping surface on said mounting members for retaining the tool within its final operative position, biasing means for urging said mounting members in a retractile direction which effects clamping of said tool in its final operative position, a locating means carried by said tool and defining the position of said tool on said mounting members to dispose the tool in the proper operative position as it is retracted into final position in said apparatus, means for interconnecting said mounting members to move said tool rectilinearly into final operative position, and additional locating means forming a part of said apparatus and engageable by said tool as it is moved retractively to accurately locate the tool in final operative position, such final position being defined independently of the first position of the tool on said mounting members.

11. In a forming apparatus, a combination tool mounting and clamping device adapted for readily mounting and demounting a forming tool, comprising a pair of spaced extendible and retractable mounting means having means for removably receiving the tool thereon and forming detachable connections therewith, means for simultaneously retracting said mounting means and tool into a final operative position on said apparatus, means forming a clamping surface on said mounting means for retaining the tool within its final operative position, biasing means for urging said mounting means in a retractile direction which effects clamping of said tool in its final operative position, a locating means carried by said tool and defining the position of said tool on said mounting means to dispose the tool in the proper operative position as it is retracted into final position in said apparatus, means for interconnecting said mounting means to move said tool rectilinearly into final operative position, additional locating means forming a part of said apparatus and engageable by said tool as it is moved retractively to accurately locate the tool in final operative position, such final position being defined independently of the first position of the tool on said mounting means, and motor means which are operator controlled for extending and retracting said mounting means whereby the tool carried by said mounting means can be extended and replaced.

12. In a material working machine comprising, in combination, a base plate for supporting a tool thereon, a first carrier-and-clamping means and a second carrier-and-clamping means disposed in spaced apart relation to slidably receive said base plate, said base plate having projections at one end for locating the base plate with respect to the carrier-and-clamping means, a support member having spaced projections, said base plate having openings corresponding to the projections on the support member for locating the base plate on the support member, a first slide member having a cam and cam-follower for effecting retracting and extending movements of said first carrier-and-clamping means, a second slide member having a cam and cam-follower for effecting retracting and extending movements of said second carrier-and-clamping means, a torsion shaft interconnecting the first slide and second slide to move the first and second carrier means simultaneously, and power means for actuating the carrier means.

13. A process for quick changing of tools in a forming machine, comprising the steps of opening the clamping means simultaneously on the fixture, slidably inserting a preselected forming tool device into the fixture to a predetermined position determined by a pair of locating ears on the forming tool device, moving the clamping means and forming tool device simultaneously to precisely position the forming tool device into operative position with respect to the fixture, and biasing the clamping means to hold the forming device in operative position.

14. A process for quick changing of tools in a forming machine, comprising the steps of opening the clamping means simultaneously on the upper fixture and the lower fixture, slidably inserting a preselected forming tool device into the upper fixture and lower fixture, moving the clamping means and forming tool device simultaneously to precisely position and secure the forming tool device into operative position with respect to the upper fixture and lower fixture, and biasing the clamping means to hold the forming device in operative position.

15. A process for quick changing of tools in a forming machine, comprising the steps of operating control means for actuating the clamping means simultaneously on the upper fixture and the lower fixture to an open position, slidably inserting a preselected forming tool device into the upper fixture and lower fixture to a predetermined first alignment position, operating control means for actuating the clamping means to close the clamping means and move the forming tool device in a rectilinear direction with respect to the fixture to a predetermined second alignment position with respect to the upper fixture and lower fixture, and biasing the clamping means to hold the forming device in operative position.

16. A process for quick changing of tools in a forming machine, comprising the steps of operating a first control means for activating the clamping means simultaneously on the fixture to an open position, slidably inserting a preselected forming tool device into the fixture to a predetermined over travel alignment in the direction of insertion to a position determined by stop means located on the forming tool device, operating a second control means for actuating the clamping means to close the clamping means and move the forming tool device backward for final alignment position and thereafter move in a rectilinear direction with respect to the fixture to its operative position.

References Cited

UNITED STATES PATENTS

| | | | |
|---|---|---|---|
| 2,984,176 | 5/1961 | Sommer et al. | 83—698 |
| 3,104,574 | 9/1963 | Anderson et al. | 83—698 |
| 3,111,100 | 11/1963 | Georgeff | 72—446 |
| 3,111,895 | 11/1963 | Kraft et al. | 83—698 |
| 3,134,350 | 5/1964 | Danly et al. | 72—446 |

WILLIAM W. DYER, JR., *Primary Examiner.*

JAMES M. MEISTER, *Examiner.*

L. B. TAYLOR, *Assistant Examiner.*